United States Patent [19]

Stevenett

[11] Patent Number: 4,750,844
[45] Date of Patent: Jun. 14, 1988

[54] MIXING MACHINE FOR ICE CREAM SHAKES

[76] Inventor: Edward A. Stevenett, 1290 N. University Ave., Provo, Utah 84601

[21] Appl. No.: 30,844

[22] Filed: Mar. 27, 1987

[51] Int. Cl.⁴ .......................... B01F 7/16; B08B 3/02
[52] U.S. Cl. .................................. 366/197; 366/138; 134/198
[58] Field of Search ............... 366/130, 198, 199, 279, 366/197, 348, 349, 138; 134/198, 199

[56] References Cited

U.S. PATENT DOCUMENTS

| | | | |
|---|---|---|---|
| 225,003 | 3/1880 | Earle | 366/197 |
| 1,199,920 | 10/1916 | Petitfils | 366/197 |
| 1,268,406 | 6/1918 | Swalm . | |
| 1,768,927 | 3/1929 | Peters | 366/197 |
| 3,230,964 | 5/1967 | Tripp . | |
| 4,416,120 | 11/1983 | Yono . | |

OTHER PUBLICATIONS

Blender/Mixer, Ad Flier.

Primary Examiner—Harvey C. Hornsby
Assistant Examiner—D. Poffenberger
Attorney, Agent, or Firm—Thorpe, North & Western

[57] ABSTRACT

A mixing machine for ice cream shakes and malts comprising a base platform and coupled back wall for partially enclosing the mixing area of the malt or shake. At least one mixing arm is provided within the area and projects downward above the platform to enable insertion within a malt container. A fluid conduit and elongated dispensing opening is provided to establish a thin layer of water across the surface of the back wall, thereby developing a flowing liquid barrier between the mixing arm and the surface of the back wall.

13 Claims, 2 Drawing Sheets

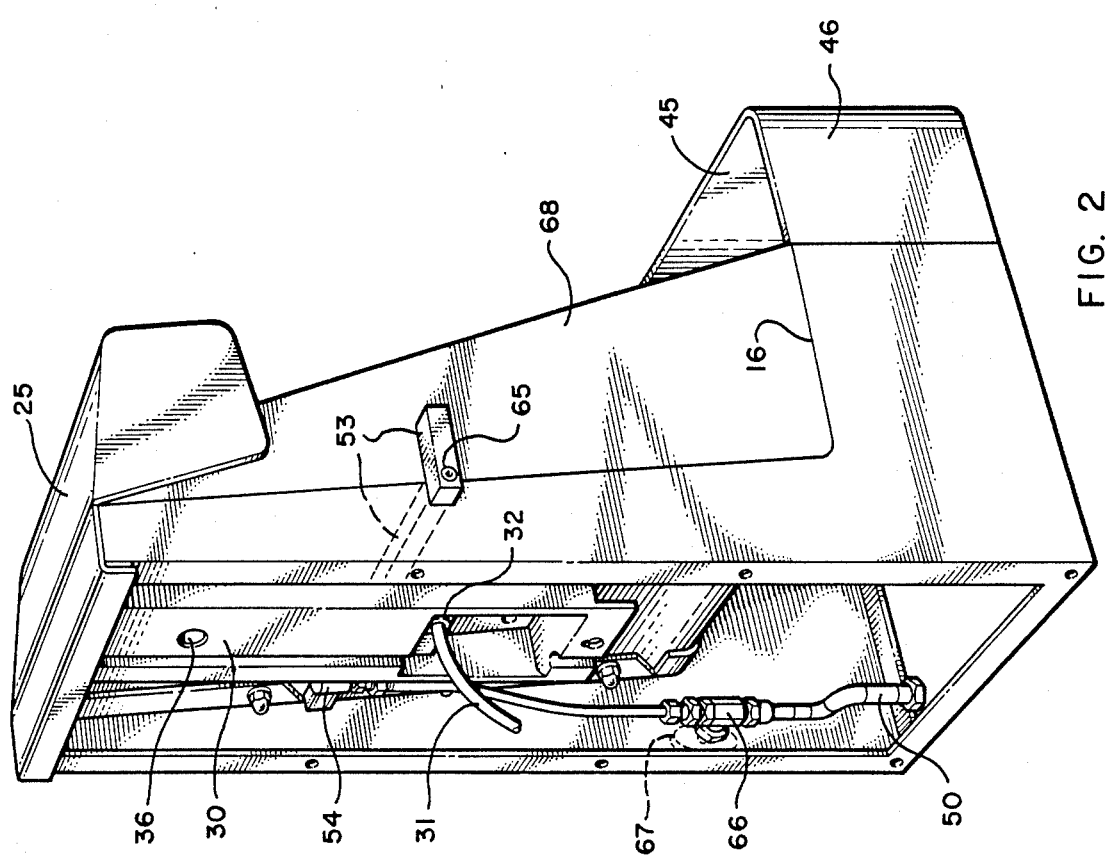
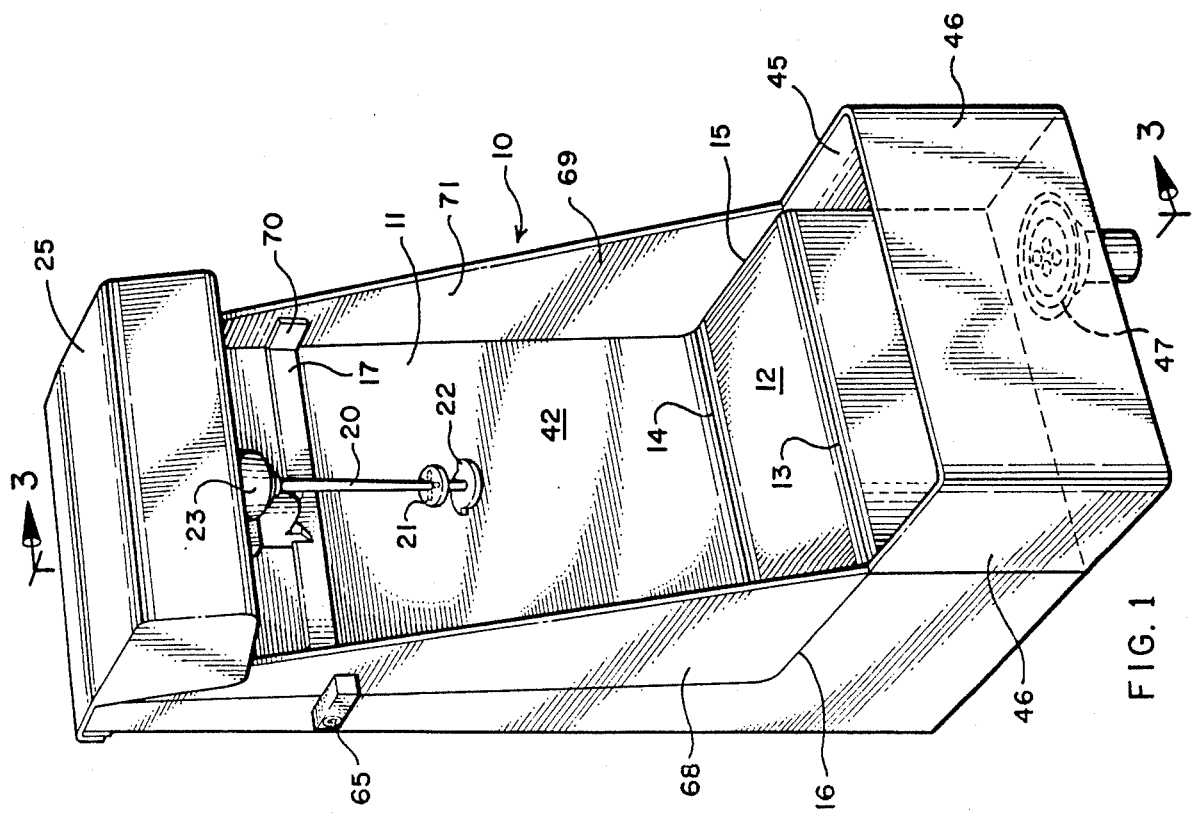

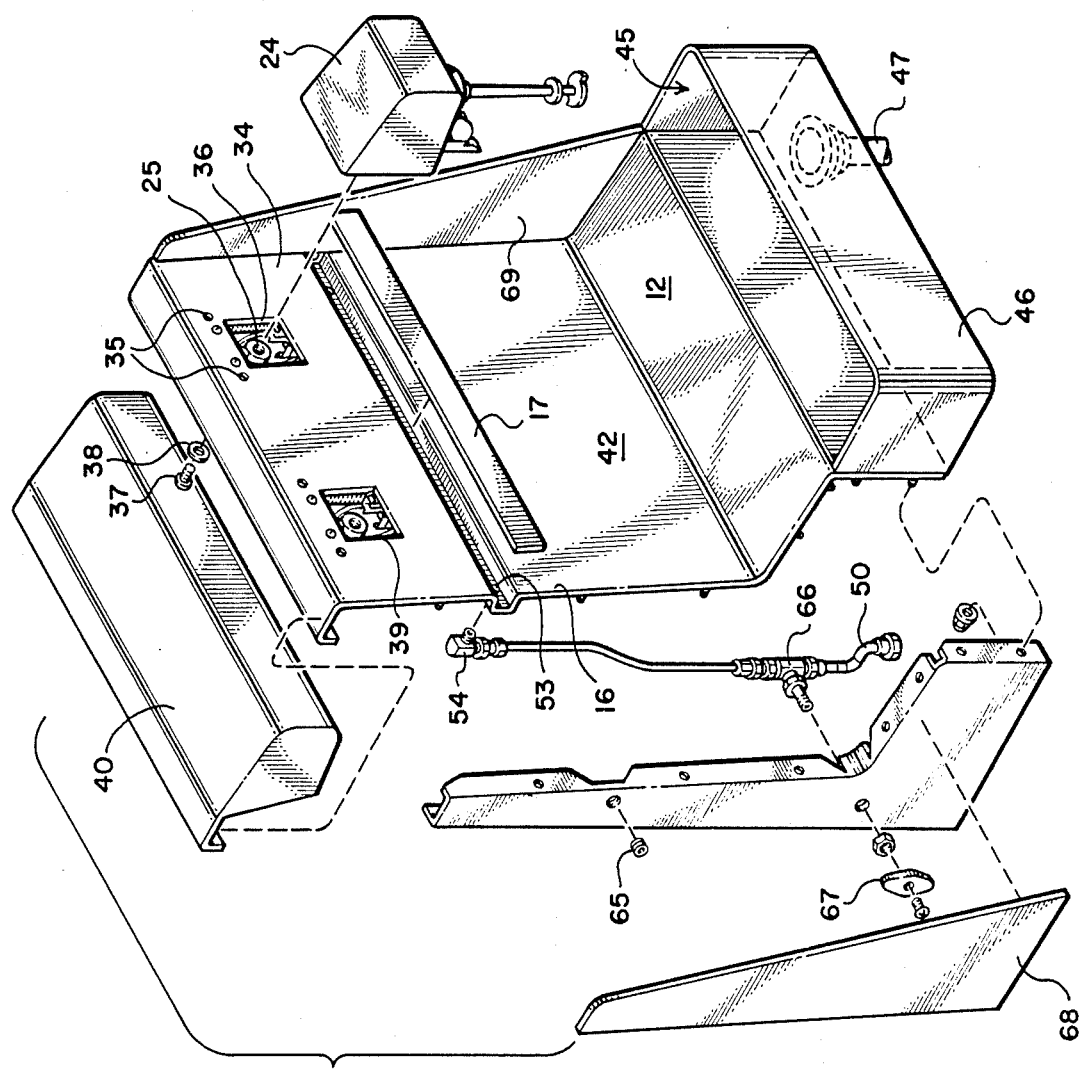
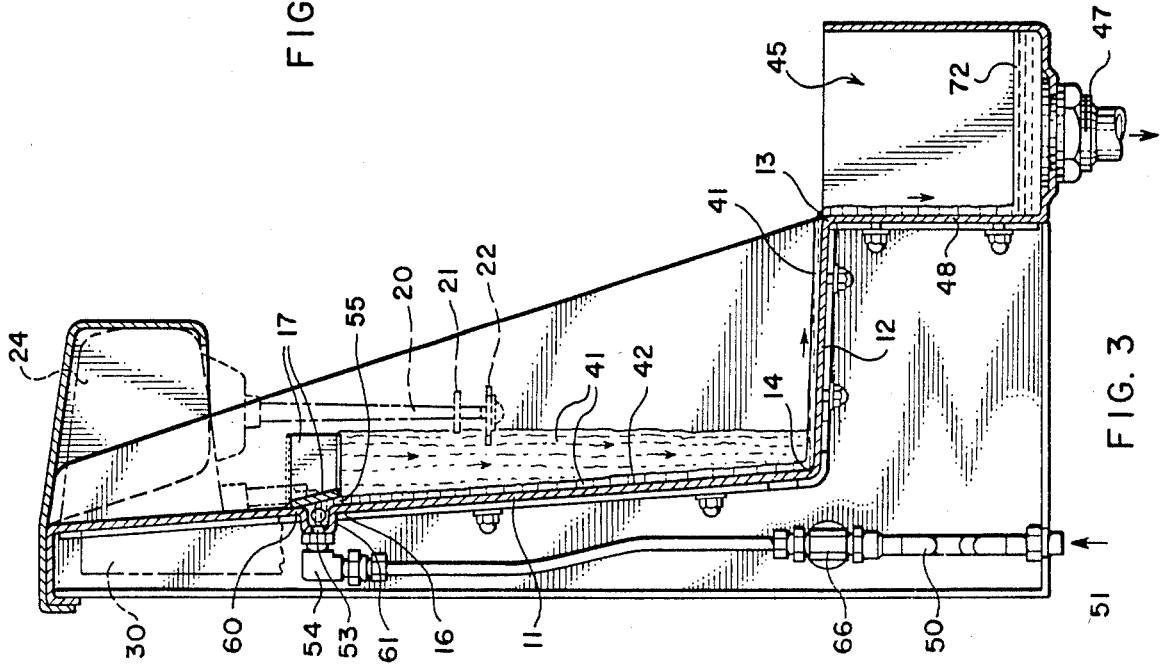

MIXING MACHINE FOR ICE CREAM SHAKES

BACKGROUND OF THE INVENTION

1. Field of Invention:

The present invention relates to mixer machines typically used in ice cream parlors for developing a uniform, slurry texture to ingredients used in making malts and milk shakes.

2. Prior Art:

The typical process for preparing a milk shake or malt involves placement of ice cream in a container, along with a fluid such as milk and flavorings. These constituents are mixed by means of a malt machine which includes a shaft having a disk-like mixing element rotatably affixed at its end. The shaft is driven by an electric motor at high speed to develop a uniform suspension of the shake or malt ingredients.

Although the typical disk-like mixing member is configured to reduce the tendency of the beater to splash ingredients out of the container, spilled and spun off ingredients frequently fly beyond the container walls. Where the malt machine includes side walls around the mixing element, it is not uncommon for spun off ingredients to build up and cause an unsightly appearance. In addition to the poor aesthetics of malt machines coated with shake mix, bits of fruit or other condiments, such food fragments are of a health concern. For example, if such materials are not frequently cleaned free from the side walls of the malt machine, bacteria may form and possibly dislodge into a container of fresh shake ingredients.

Accordingly, what is needed is a shake machine which eliminates build up of ingredients at side wall surfaces and which enhances a clean and healthy mixing environment.

OBJECTS AND SUMMARY OF THE INVENTION

It is an object of the present invention to provide such a mixing machine for ice cream shakes and malts which provides means for carrying away any spilled or spun off ingredients for immediate disposal.

It is a still further object of the present invention to provide such a mixing machine wherein a flowing sheet of water protects side walls from contact with spun off ingredients.

It is a further object of the present invention to provide a mixing machine which provides an integral device having the constant appearance of freshly washed surfaces and a highly sanitary work place.

It is an additional object of this invention to provide a malt mixing machine which includes a fluid receiving tank capable of holding accessories used with the malt mixing machine such as container extensions, spoons and stirring utensils.

These and other objects are realized in a mixing machine for ice cream shakes and malts which comprises a base platform having a forward edge, rearward edge and laterally opposing side edges, with a horizontal surface therebetween for supporting a malt container. A back wall is coupled to the platform at a rearward edge thereof and extends upward to provide a partial wall around the mixing area. The back wall has a flat, nonporous surface which is substantially impermeable to water to enable the development of a fluid wall. The machine includes at least one mixing arm projecting downward above the platform and being positioned forward of the back wall in an orientation enabling the mixing arm to be inserted within the container of malt or shake ingredients. The machine further includes a fluid wall forming system which imposes a thin layer of water across the surface of the back wall to develop a flowing liquid barrier which captures any spun off ingredients which may contact the water barrier. Such ingredients are flushed clear of the wall and into a fluid receiving trough.

Other objects and features of the present invention will be apparent to those skilled in the art, in view of the following detailed description taken in combination with the accompanying drawings.

DESCRIPTION OF THE DRAWINGS

FIG. 1 is an elevated, frontal, perspective view of one embodiment of the subject invention.

FIG. 2 is an elevated, rear, perspective view of the invention shown in FIG. 1.

FIG. is a cross section of the invention, taken along the lines 3—3 in FIG. 1 with the mixer shown in phantom lines and including a representation of flowing water therein.

FIG. 4 shows a second embodiment of the subject invention in disassembled form.

DETAILED DESCRIPTION OF THE INVENTION

The accompanying drawings illustrate a mixing machine 10 for ice cream shakes or malts constructed in accordance with principles of the present invention which prevent accumulation of droplets of ingredients from collecting at a back wall 11 thereof. The basic elements of the mixing machine include a base platform 12 which has a forward edge 13, a rearward edge 14 and laterally opposing side edges 15 and 16. Although the platform 12 is configured in rectangular shape, it could obviously be adapted to other configurations as well. The function of the platform is not only to provide a supporting surface for a container or cup of shake or malt ingredients, but to provide a transfer surface for fluids as will be described hereinafter. The preferred embodiment illustrates a base platform having a substantially flat surface.

The back wall 11 is coupled at the rearward edge 14 of the platform and extends upward from its bottom edge (merged with edge 14) to a top edge 16 (FIG. 3) which is concealed behind a fluid deflection plate 17 which will be discussed hereafter. This back wall 11 is configured as a flat surface which is nonporous and substantially impermeable to water. The present embodiment is fabricated from stainless steel, which not only offers impermeability to water, but provides a clean, culinary appearance to the mixing machine.

At least one mixing arm 20 projects downward above the platform 12 and is positioned forward of the back wall 11 in an appropriate orientation for enabling the mixing arm 20 to be operated within a cup or container of the malt or shake ingredients. Although many mixer or blender devices may be utilized, the present embodiment illustrates a wallmountable drink mixer manufactured by Hamilton Beach, Model 948. This mixer includes the mixer arm 20 and attached beater elements 21 and 22 and protective cap 23. The motor for driving the mixing arm 20 is contained in a casement 24, illustrated in FIGS. 3 and 4 and concealed by a top cover 25 in FIGS. 1 and 2. This motor is a Universal AC-DC motor of conventional design and has a speeds ranging from 13,000 to 18,000 rpm unloaded. As was previously mentioned, it is the rotating arm 20 which tends to splatter or otherwise spin off droplets of ingredients due to its high speed rotation.

The motor and mixing arm are mounted at a rear mounting plate 30 which also provides an opening for an electrical power cord 31 to be secured by a grommet 32. Mounting details have been deleted in view of their conventional nature. A basic, mounting configuration is illustrated in FIG. 4 which shows the motor 24 forward of its mounted location 25. The motor 24 is positioned against a support wall 34 which is integrally formed with the rear wall 11 as will be discussed in greater detail hereafter. Rearward locating stubs (not shown) are located on a rearward surface of the motor 24 and seat in alignment openings 35 in the support wall 34. An opening 36 through the mounting structure 30 permits insertion of a bolt 37 and washer 38 into a threaded opening (not shown) at the rearward side of the motor 24 for rigid mounting. This system of mounting is merely exemplary of many types of mounting techniques and may be repeated for units having multiple motor and mixing arms as shown in FIG. 4. For example, a second mounting location 39 is illustrated without an accompanying motor. As with the earlier embodiments of FIGS. 1 through 3, FIG. 4 includes a top cover 40 which is secured to a flange of the upper support wall 34 in the same manner as shown for FIGS. 1 through 3. In the preferred embodiment, this top cover 40 (or 24 in FIGS. 1 through 3) is fabricated of stainless steel to enhance the clean, culinary appearance of the mechanism.

A primary aspect of the present invention involves the formation of a substantially uniform, thin layer of water 41 across the surface 42 of the back wall 11. The function of this water is to provide a flowing, liquid barrier between the mixing arm 20 and the surface 42 of the back wall. During operation, any spray of milk shake ingredient is immediately entrained in the fluid barrier 41 and moves down the back wall surface 42 with the flow of fluid 41. This fluid flows across the base platform 12, across the forward edge 13 of the platform and into a receiving trough 45. This fluid receiving trough 45 has a length approximately equal to a width of the forward edge 13 of the platform. Wall structure 46 of the trough extends forward of the base platform and provides a storage location for utencils and other hardware utilized to prepare the milk shake. A drain pipe 47 provides means for draining fluid from the trough 45.

As can be seen more clearly in FIG. 3, the back wall 11, base platform 12 and back wall of trough structure 48 are all formed of a single sheet of metal bent in the desired configuration. In this form, the rounded, bent corner 14 provides a fluid transfer means between the back wall 11 and base platform 12 for delivery of the cascading water 41 into the trough 45.

The means for developing the required thin layer of water 41 includes an assembly of plumbing fixtures and tubing 50 which brings water from an exterior source 51 to a distribution channel 53 which traverses the top edge 16 of the back wall 11. Fluid is communicated to this channel or conduit 53 through an elbow 54 which couples the plumbing 50 into the flow line of the machine 10.

Water is fed through the plumbing into the conduit channel 53 under pressure, causing the full length of the conduit to fill with water. Plate 17 encloses an open front portion of the channel 53, except for a small slotted opening 55 which forces water flow downward along the back wall surface 42 as illustrated in FIG. 3. It will be apparent to those skilled in the art that other forms of water feed systems can be utilized to develop the required uniform layer of water 41 along the back wall surface. Such water outlets will typically have a water dispensing end g orienting toward the surface of the back wall and adapted to apply the layer of water toward its top edge 16. Such water cascades down the back wall and developes the identified barrier 41.

In the present embodiment, the specific structure utilized to form the fluid wall 41 involves a fluid conduit 53 which is integrally formed into an upper portion of the back wall 11. The outlet 55 necessarily projects downward to impose water against the upper surface of the back wall 11 In fact, the upper support wall 34 is a continuous sheet of metal extending downward and forming the channel 53, back wall 11, base platform 12 and portions of the trough 45. The channel 53 formed directly in this sheet metal includes an upper edge 60 and a lower edge 61 which forms a juncture with the top edge 16 of the back wall. Although the channel deflection in the illustrations extends rearward of the back wall, it will be apparent to those skilled in the art that a forward projecting channel could likewise be adapted to develop the required fluid barrier 41. In the present embodiment, the channel structure is oriented rearward and forms an angle between the back wall and an adjacent channel wall near the lower edge 61 having a angular value of less than 180 degrees such that water flows across this juncture and down the surface of the back wall as illustrated, forming the fluid barrier 41.

The thickness of fluid barrier 41 may be partially controlled by adjustment of the slot opening 55 between the water deflection plate 17 and a top edge 16 of the back wall. Improved uniformity of the fluid barrier 41 is developed by extending a lower edge of the deflection plate 17 forward of and below the lower edge 61 of the channel, near the surface of the back wall. This construction develops a second flow channel between an inside surface of the plate 17 and an upper portion of the back wall surface at 16. By making this channel sufficiently narrow, fluid pressure is retained therein, causing the water to escape at a more rapid velocity along the direction of travel at the g back wall 11. In this sense, the first fluid channel 53 operates to distribute the fluid along the back wall 11 and retain the fluid at a high pressure. The second channel formed between the upper portion of the back wall at 16 and lower side of the deflection plate 17 gives direction to the pressurized water, forcing it to rapidly move down the back wall and develop the required barrier 41. It has been found that an appropriate distance of separation between the plate 17 and back wall surface 42 (at item 16) is typically less than three milimeters. Under usual water pressures, adequate acceleration of the water is provided to maintain the general uniform fluid wall desired as item 41.

FIG. 4 discloses in a larger embodiment the same construction as set forth for FIGS. 1 through 3, accordingly, similar numerals have been applied showing the various structural components. The disassembled view helps to clarify the relationship and construction of these elements as previously set forth for the single motor embodiment of FIGS. 1 through 3.

In the event debris or other matter is accumulated within the conduit or channel 53, a flush port 65 is provided. Where the plumbing introduces pressurized water at one side of the conduit, the flush port 65 is located at the opposing channel end. By releasing the cap of the flush port 65, water can be rapidly expelled, carrying any debris which may be captured within the channel 53. With a larger embodiment such as shown in FIG. 4, a flush port may be introduced at each side of the channel 53, to permit pressurized water to escape both sides for fully cleansing this enclosed area. Water pressure for this flushing operation, as well as for the principal flow developed along the back wall is controlled by a conventional valve 66 and valve handle 67.

Side wall structure 68 and 69 is provided to prevent lateral water flow and to provide direction to ensure that all fluid enters the trough 45. Such side walls are coupled at lateral edges of the back wall and may include an extended channel 70 for directing water downward and along each side wall interior surface 71. Accordingly, a thin layer of water may be utilized at the side walls in a manner similar to that provided at the back wall by fluid barrier 41. The side walls, back wall and base platform cooperate together to channel water flow into the receiving tank 45. Typically, this receiving tank will have side wall structure and means for developing a depth of at least three centimeters of water 72, which may be used to clean utensils and other accessories.

The typical method of operation for this invention involves coupling the plumbing hardware 50 to an existing water line and positioning the machine on a flat surface. The fluid barrier 41 is activated by opening the fluid line valve 66 and filling the fluid conduit 53 with water, causing water pressure to eject a fluid wall through the slotted opening 55, thereby forming a substantially continuous, uniform thin layer of water down the back wall surface 42. The operator allows this continuous fluid flow to be maintained while ingredients of the malt or milkshake are assembled and inserted within a container. The mixing arm 20 is then inserted within the container and activated to mix the ingredients. Any spattered ingredients are quickly carried by the fluid wall into the trough 45 for disposal.

The subject invention offers many improvements over the prior art. First, and most important, is increased cleanliness. The constantly flowing water allows no accumulation of ingredients which may splash from the container onto back wall or side wall structure. This clean environment enhances the confidence of the customer, as well as protecting his health and safety. In addition, the constantly flowing water barrier 41 provides an aesthetic element to the environment which not only relates to cleanliness, but also contributes to improved decor. This flowing liquid barrier catches the interest and imagination of the customer by its glittering surface under interior store lights, as well as the constant sound generated as the fluid passes over the wall, base platform and into the trough Further, because the fluid wall entraps ingredients sprayed by the mixing arm, the typical cleaning operations required of the attendant are greatly minimized. Accordingly, the attendant may give greater attention to customers and to the preparation of shake or malt products, instead of to clean up efforts which have heretofore been required after each malt or shake preparation sequence. Accordingly, the present invention offers benefits of health, safety, time and dollar savings and customer interest.

It will be apparent to those skilled in the art that the illustrated embodiments set forth in this disclosure are subject to variation. Accordingly, it is understood that the invention is to be limited only by the following claims, and not the specific examples provided herein.

I claim:

1. A mixing machine for ice cream shakes or malts, comprising:

a base platform having a forward edge, a rearward edge, laterally opposing side edges and a substantially flat surface therebetween for supporting a container of shake or malt ingredients to be mixed;

a back wall coupled at the rearward edge of the platform and extending upward therefrom, said back wall having a flat, nonporous surface substantially impermeable to water and extending from a bottom edge of the back wall toward a top edge thereof;

at least one mixing arm projecting downward above the platform and being positioned forward of the back wall in an orientation which enables the mixing arm to be inserted within the container;

means for forming a substantially uniform, thin layer of water across the surface of the back wall to thereby provide a flowing liquid barrier between the mixing arm and the surface of the back wall; and power means for operating the mixing arm.

2. A mixing machine as defined in Claim 1, further comprising:

a fluid receiving trough having a length approximately equal to a width of the forward edge of the platform and being coupled thereto and adapted for receiving fluid from the platform;

fluid transfer means coupled between the platform and the back wall for redirecting the thin layer of water from the bottom edge of the back wall over the platform surface for delivery to the trough; and fluid disposal means coupled to the trough for disposal of the water.

3. A mixing machine as defined in Claim 2, wherein the receiving trough includes a fluid holding tank having a tank depth sufficient to retain water from the platform at a depth of at least 3 cm for rinsing accessory equipment used with the mixer.

4. A device as defined in Claim 1, wherein the means for forming the thin layer of water at the back wall comprises a fluid conduit to the back wall toward the top edge thereof and having a length extending across the back wall, said fluid conduit including water outlets positioned along the length of the conduit;

said water outlets having a water dispensing end oriented toward the surface of the back wall and adapted to apply a layer of water across the back wall toward its top edge, thereby enabling the water to cascade down the wall and develop a barrier against adhesion of food materials at the back wall.

5. A device as defined in Claim 4, wherein the fluid conduit is integrally formed into an upper portion of the back wall, said outlet projecting downward from the conduit and at an orientation which imposes water from the conduit against an upper surface of the back wall.

6. A device as defined in Claim 5, wherein the conduit comprises a channel formed integrally with the back wall and extending horizontally near an upper portion of the back wall, said channel having an upper edge and a lower edge, the lower channel edge forming a junction with the surface of the back wall wherein the outlet comprises a slotted opening extending along the juncture to permit water to flow therethrough and onto the back wall surface.

7. A device as defined in Claim 6, wherein the channel extends rearward of the back wall, said juncture forming an angle between the back wall and an adjacent channel wall near the lower edge such that water flows across said juncture and down the surface of the back wall.

8. A device as defined in Claim 7, wherein the outlet includes a front plate coupled to the channel at the top edge of the channel, said plate having a lower edge which extends forward of and below the lower edge of the channel and near the surface of the back wall, yet spaced a short distance therefrom to form a second flow channel between an inside surface of the plate and a upper portion of the back wall surface, said flow channel communicating to the first channel interior, thereby providing a surface of water for delivery to the back wall surface.

9. A device as defined in Claim 8, wherein the distance of separation between the plate and back wall surface is less than 3 mm.

10. A device as defined in Claim 1, further comprising at least one flush port coupled to the fluid conduit and adapted with means for coupling a separate source of water for high pressure purging and cleaning of the conduit.

11. A device as defined in Claim 1, further comprising side walls coupled at lateral edges of the back wall, said g water layer forming means extending across an upper portion of each side wall and operable to develop a thin layer of water across the surface of each side wall, a bottom edge of each side wall being coupled to respective side edges of the platform to enable water to flow onto the platform from the side wall.

12. A method for mixing ice cream shakes or malts, comprising:
 preparing a mixing machine to mix ingredients within a container, said mixing machine having a back wall coupled at the rearward edge of a base platform and extending upward therefrom, said back wall having a flat, nonporous surface substantially impermeable to water and extending from a bottom edge of the back wall to a top edge thereof; said mixing machine also including at least one mixing arm projecting downward above the platform and being positioned forward of the back wall in an orientation which enables the mixing arm to be inserted within the container;
 forming a continuous, uniform, thin layer of water flow down the surface of the back wall to thereby provide a flowing liquid barrier between the mixing arm and the surface of the back wall; and
 collecting the water flow from the back wall, along with any entrained food particles for disposal.

13. A mixing device for preparing ice cream shakes or malts, said device comprising:
 a base platform;
 a back wall coupled to the base platform and extending upward therefrom, said back wall having a flat, non-porous surface substantially impermeable to water and extending from a bottom edge of the back wall to a top edge thereof;
 means for attaching at least one mixing arm projecting downward above the platform and being ositioned forward of the back wall in an orientation which enables the mixing arm to be inserted within a container of milk shake or malt; and
 means for forming a continuous, uniform, thin layer of water flow down the surface of the back wall to thereby provide a flow liquid barrier between the mixing arm and the surface of the back wall.

* * * * *